(12) United States Patent
Send et al.

(10) Patent No.: US 11,714,425 B2
(45) Date of Patent: Aug. 1, 2023

(54) AUTONOMOUS ROBOTIC DEVICE AND ASSOCIATED CONTROL METHOD

(71) Applicant: trinamiX GmbH, Ludwigshafen am Rhein (DE)

(72) Inventors: Robert Send, Ludwigshafen (DE); Ingmar Bruder, Ludwigshafen (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 429 days.

(21) Appl. No.: 16/649,499

(22) PCT Filed: Oct. 11, 2018

(86) PCT No.: PCT/EP2018/077727
§ 371 (c)(1),
(2) Date: Mar. 20, 2020

(87) PCT Pub. No.: WO2019/072965
PCT Pub. Date: Apr. 18, 2019

(65) Prior Publication Data
US 2020/0272168 A1    Aug. 27, 2020

(30) Foreign Application Priority Data
Oct. 11, 2017 (EP) .................................. 17195920

(51) Int. Cl.
*G06F 17/00* (2019.01)
*G05D 1/02* (2020.01)
*G05D 1/00* (2006.01)

(52) U.S. Cl.
CPC ......... *G05D 1/0274* (2013.01); *G05D 1/0088* (2013.01); *G05D 1/0219* (2013.01);
(Continued)

(58) Field of Classification Search
CPC .. G05D 1/0274; G05D 1/0088; G05D 1/0219; G05D 1/0221; G05D 2201/0203; G05D 2201/0215
(Continued)

(56) References Cited

U.S. PATENT DOCUMENTS 9,574,883 B2 *  2/2017  Watts ................... H04W 4/029
9,592,609 B2 *  3/2017  LaFary .............. G05B 19/4061
(Continued)

FOREIGN PATENT DOCUMENTS

DE      10 2007 010 979 B3    5/2008
JP          2008090575 A       4/2008
WO      WO 2016/098050 A1     6/2016

OTHER PUBLICATIONS

Probability Distribution in Data Science—Definition & Types (Year: 2017).*
(Continued)

*Primary Examiner* — Ronnie M Mancho
(74) *Attorney, Agent, or Firm* — Armstrong Teasdale LLP

(57) ABSTRACT

An autonomous device and method for controlling an autonomous device are disclosed. The autonomous device is configured for performing at least one task, selected from a household task, a commercial task and an industrial task. The autonomous device comprises at least one spatial sensor for generating location information and at least one further sensor for determining at least one further parameter. The autonomous device further comprises at least one task unit arranged to perform the household and/or commercial and/ or industrial task, and at least one electronics unit, wherein the electronics unit is configured to generate a map using the location information, wherein the electronics unit further is configured for connecting the further parameter to the location information and adding the location of the further
(Continued)

parameter to the map, thereby creating a parameter map containing location-correlated values of the at least one further parameter.

16 Claims, 3 Drawing Sheets

(52) U.S. Cl.
CPC ... *G05D 1/0221* (2013.01); *G05D 2201/0203* (2013.01); *G05D 2201/0215* (2013.01)

(58) Field of Classification Search
USPC .......................................................... 700/23
See application file for complete search history.

(56) References Cited

U.S. PATENT DOCUMENTS

| | | | |
|---|---|---|---|
| 9,984,558 B2* | 5/2018 | Artes | G08B 13/19645 |
| 11,348,269 B1* | 5/2022 | Ebrahimi Afrouzi | G06T 7/344 |
| 11,435,192 B1* | 9/2022 | Ebrahimi Afrouzi | G05D 1/0272 |
| 2005/0171644 A1 | 8/2005 | Tani | |
| 2005/0273226 A1 | 12/2005 | Tani | |
| 2010/0106298 A1* | 4/2010 | Hernandez | G05D 1/0221 700/250 |
| 2012/0078417 A1 | 3/2012 | Connell, II et al. | |
| 2014/0207281 A1* | 7/2014 | Angle | H04L 12/282 700/257 |
| 2015/0254800 A1 | 9/2015 | Johnson et al. | |
| 2016/0050840 A1 | 2/2016 | Sauder et al. | |
| 2018/0158179 A1 | 6/2018 | Sauder et al. | |
| 2022/0187841 A1* | 6/2022 | Ebrahimi Afrouzi | G05D 1/0242 |

OTHER PUBLICATIONS

Standard Statistical Distributions (e.g. Normal, Poisson, Binomial) and their uses | Health Knowledge (Year: 2016).*
U.S. Appl. No. 15/547,664, filed Jul. 31, 2017, US 2018/0017679 A1, Sebastian Valouch, et al.
U.S. Appl. No. 15/778,454, filed May 23, 2018, US 2018/0356501 A1, Robert Send, et al.
U.S. Appl. No. 15/775,424, filed May 11, 2018, US 2018/0329024 A1, Robert Send, et al.
U.S. Appl. No. 16/091,409, filed Oct. 4, 2018, US 2019/0157470 A1, Robert Send, et al.
U.S. Appl. No. 16/096,361, filed Oct. 25, 2018, US 2019/0129035 A1, Sebastian Valouch, et al.
U.S. Appl. No. 16/095,846, filed Oct. 23, 2018, Sebastian Valouch.
U.S. Appl. No. 16/090,990, filed Oct. 3, 2018, Sebastian Valouch, et al.
U.S. Appl. No. 16/094,402, filed Oct. 17, 2018, US 2019/0129036 A1, Sebastian Valouch, et al.
U.S. Appl. No. 16/321,143, filed Jan. 28, 2019, US 2019/0172964 A1, Wilfried Hermes, et al.
U.S. Appl. No. 16/347,364, filed May 3, 2019, Michael Eberspach, et al.
U.S. Appl. No. 16/461,654, filed May 16, 2019, US 2019/0339356 A1, Christian Schildknecht, et al.
U.S. Appl. No. 16/344,538, filed Apr. 24, 2019, US 2019/0277703 A1, Sebastian Valouch, et al.
U.S. Appl. No. 16/344,511, filed Apr. 24, 2019, US 2020/0049800 A1, Sebastian Valouch, et al.
U.S. Appl. No. 16/321,054, filed Jan. 28, 2019, US 2019/0170849 A1, Wilfried Hermes, et al.
U.S. Appl. No. 16/484,369, filed Aug. 7, 2019, Christoph Lungenschmied, et al.
U.S. Appl. No. 16/478,907, filed Jul. 18, 2019, US 2019/0386064 A1, Sebastian Valouch, et al.
U.S. Appl. No. 16/461,670, filed May 16, 2019, US 2019/0353767 A1, Michael Eberspach, et al.
U.S. Appl. No. 16/636,148, filed Feb. 3, 2020, Patrick Schindler, et al.
U.S. Appl. No. 16/500,113, filed Oct. 2, 2019, Timo Altenbeck, et al.
U.S. Appl. No. 16/483,231, filed Aug. 2, 2019, US 2020/0011995 A1, Robert Send, et al.
U.S. Appl. No. 16/639,387, filed Feb. 14, 2020, Sebastian Valouch, et al.
U.S. Appl. No. 16/623,557, filed Dec. 17, 2019, Christoph Lungenschmied, et al.
U.S. Appl. No. 16/638,946, filed Feb. 13, 2020, Patrick Schindler, et al.
International Preliminary Report on Patentability and Written Opinion of the International Searching Authority dated Apr. 14, 2020 in PCT/EP2018/077727 filed Oct. 11, 2018, 11 pages.
International Search Report and Written Opinion dated Jan. 28, 2019 in PCT/EP2018/077727 filed on Oct. 11, 2018.

* cited by examiner

AUTONOMOUS ROBOTIC DEVICE AND ASSOCIATED CONTROL METHOD

TECHNICAL FIELD

The invention generally relates to a device and a method for performing at least one task related to a variety of tasks, such as for example household, commercial, or industrial tasks. The device and method according to the present invention specifically may be employed, for example in various areas of daily life, where robots may be used, such as cleaning, specifically vacuuming or wiping, gardening, e.g. mowing, and/or transporting. The device and method may further be used for professional purposes, specifically, as an example, the device and method may be used in the area of surveillance, such as for security surveillance and/or for patient, children, or elderly person monitoring in the field of professional care. Further, the device and method may also be used in the field of transport, such as logistics and storage. However, other applications are also possible.

BACKGROUND ART

A large number of robots or autonomous guided vehicles configured for household, commercial and industrial use are known from prior art. The robots may be used, for example, for cleaning, e.g. vacuuming and wiping, mowing, surveillance, agriculture, and transport, e.g. in storage and logistics. Without narrowing the scope, the invention specifically will be described with respect to household use, such as for example for use of performing cleaning tasks, e.g. vacuuming and/or wiping, and gardening tasks, e.g. mowing.

As an example, US 2005/0171644 A1 discloses an autonomous mobile robot cleaner that can thoroughly clean areas along walls or other obstacles in a room. During a cleaning operation, the robot cleaner creates map information about already cleaned areas and areas where an obstacle is present and stores the map information in a memory. The robot cleaner performs a basic cleaning operation to clean areas while moving in the areas in accordance with a predetermined movement procedure. Subsequently, the robot cleaner performs an uncleaned area cleaning operation to clean uncleaned areas that cannot be cleaned by the basic cleaning operation, based on the map information. Thereafter, the robot cleaner performs an edge cleaning operation to clean the edge of an obstacle based on the map information.

Further, WO 2016/098050 A1 describes a method for recording data from at least one sensor of a robotic vehicle responsive to the robotic vehicle transiting a portion of a parcel and determining a confidence score associated with the recorded data for each of a plurality of potential detection events. The confidence score may correspond to a probability that the recorded data corresponds to an object or feature. The method may further include generating map data comprising one or more objects or features correlated to potential detection events based at least in part on the confidence score of the respective objects or features.

US 2005/0273226 A1 allows a self-propelled cleaner to generate geographical information while traveling in the room, using the detection results of passive sensors for auto focus (AF) and the like, and when a fire is detected by a smoke sensor and/or a temperature sensor, travel to a predetermined guided occupant calling position with the highest priority, shout a guidance messages there, and guide the occupant to an evacuation gate along an evacuation route. It is possible to set a plurality of guided occupant calling positions with priority assigned to each position, and move the self-propelled cleaner to the next guided occupant calling position if there is no response at the first guided occupant calling position.

US 2016/0050840 A1 describes a method for agronomic and agricultural monitoring that includes designating an area for imaging, determining a flight path above the designated area, operating an unmanned aerial vehicle (UAV) along the flight path, acquiring images of the area using a camera system attached to the UAV, and processing the acquired images.

In US 2012/0078417 A1 techniques for energy and environmental leak detection in an indoor environment using one or more mobile robots are provided. An energy leak detection system is provided. The energy leak detection system includes one or more mobile robots configured to move throughout at least a portion of a building and to take temperature and air flow measurements at a plurality of locations within the building. An environmental leak detection system is also provided. The environmental leak detection system includes one or more mobile robots configured to move throughout at least a portion of a building and to take airborne matter measurements at a plurality of locations within the building.

Further, DE 10 2007 010 979 B3 discloses a method for cleaning a floor surface by means of a self-propelled cleaning device, in particular a robot vacuum cleaner, which is equipped with a drive unit, a control unit for controlling the direction of travel and a sensor device for detecting a position-dependent state parameter of the floor surface, wherein the control unit controls the direction of travel as a function of the position-dependent state parameter of the floor surface detected by the sensor device. In order to shorten the processing time of the individual areas of the ground surface and nevertheless achieve a satisfactory result, the control device determines the degree of contamination of individual areas of the ground surface as a position-dependent state parameter on the basis of the amount of dirt recorded there during the cleaning and detected by the sensor device, stores this and controls the processing intensity of an area in a subsequent processing cycle as a function of the stored degree of contamination of this area. Despite the advantages involved in using robots configured for performing household, commercial and industrial tasks, such as for example cleaning, mowing, surveillance and transport, several technical challenges remain. Thus, performing the task, in general, may be a time consuming procedure. Further, many of the tasks performed by robots commonly involve complex and expensive pre-configurations or settings.

PROBLEM TO BE SOLVED

It is therefore desirable to provide means and methods which address the above mentioned technical challenges of performing household, commercial or industrial tasks using a robot. Specifically, a device and a method shall be proposed for improving the performance of the tasks, particularly vacuuming, wiping, mowing and the like, compared to devices and methods known in the art.

DISCLOSURE OF THE INVENTION

This problem is addressed by the device and method with the features of the independent claims. Advantageous embodiments which might be realized in an isolated fashion or in any arbitrary combinations are listed in the dependent claims.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted, that the terms "at least one", "one or more" or similar expressions indicating that a feature or element may be present once or more than once typically will be used only once when introducing the respective feature or element. In the following, in most cases, when referring to the respective feature or element, the expressions "at least one" or "more than one" will not be repeated, non-withstanding the fact, that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of the invention an autonomous device configured for performing at least one task selected from a household task, a commercial task and an industrial task is disclosed. The autonomous device comprises at least one spatial sensor for generating location information and at least one further sensor for determining at least one further parameter.

The term "autonomous device" as used herein is a broad term and is to be given its ordinary and customary meaning to a person of ordinary skill in the art and is not to be limited to a special or customized meaning. The term specifically may refer, without limitation, to an arbitrary device configured for performing at least one task autonomously. Thus, the autonomous device may be configured for performing the task in the absence of external assistance or instructions, such as for example without assistance from a user or control by a user. Specifically, the autonomous device may be configured to react to specific situations independent from external input, e.g. by using pre-programmed routines, self-learning mechanisms or the like.

The term "task" as used herein is a broad term and is to be given its ordinary and customary meaning to a person of ordinary skill in the art and is not to be limited to a special or customized meaning. The term specifically may refer, without limitation, to an arbitrary assignment to be performed by a robot. The task may specifically relate to a household task, a commercial task or an industrial task. In particular, the task may relate to cleaning surfaces, such as for example vacuum cleaning and/or wiping floors and/or washing surfaces and/or waxing surfaces and/or mopping surfaces. The task may further relate to agriculture and/or gardening, particularly for example monitoring and/or fertilizing and/or watering plants and/or mowing grass and/or raking lawn and/or scarifying lawn. Further, the task may refer to removing litter, such as dig litter or cat litter. Further, the task may refer to cleaning pools, windows, rain gutters or the like. Further, the task may refer to charging electrical devices. Further, the task may refer to carrying purchased items, luggage or the like. Further, the task may involve an educational or entertainment task. Further, the task may involve following a user such as in a luggage carrying or smart cart application. Further, the task may refer to delivering, picking up, interacting with, or holding objects. Further, the task may involve monitoring patients, children, or elderly persons, such as in a professional care application. Further, the task may also refer to surveillance tasks and/or transporting tasks.

The term "spatial sensor" as used herein is a broad term and is to be given its ordinary and customary meaning to a person of ordinary skill in the art and is not to be limited to a special or customized meaning. The term specifically may refer, without limitation, to an arbitrary sensor configured for generating location information. Particularly, the spatial sensor may be configured for generating location information on the autonomous device.

The term "location information" as used herein is a broad term and is to be given its ordinary and customary meaning to a person of ordinary skill in the art and is not to be limited to a special or customized meaning. The term specifically may refer, without limitation, to arbitrary information related to a spatial position of an object and/or orientation of the object in space. Specifically, location information may be or may comprise a set of numbers, letters or symbols specifying a position of an object within a spatial reference system, such as for example a geographic coordinate system, a Cartesian coordinate system, a polar coordinate system or other types of coordinate systems. As an example, the spatial sensor may generate location information of the anonymous device within a Cartesian coordinate system, having its origin at a starting position of the anonymous device. Additionally or alternatively, the spatial sensor may generate location information of one or more objects within a vicinity of the autonomous device. As an example, the spatial sensor may generate the location information of one or more than one object in an area, specifically a circular area having a radius r. The radius r may vary from 0 to 50 m, preferably from 0 to 20 m, more preferably from 0 to 10 m, most preferably from 0 to 5 m.

The term "further sensor" as used herein is a broad term and is to be given its ordinary and customary meaning to a person of ordinary skill in the art and is not to be limited to a special or customized meaning. The term specifically may refer, without limitation, to an arbitrary sensor, such as for example a particle sensor, e.g. using spectroscopic analysis or visible light, a dirt sensor, a dust sensor, an infrared sensor, a grass sensor, an air quality sensor, a temperature sensor, a gas sensor, a battery sensor, a voltage sensor, a current sensor, a power consumption sensor, a wheel speed sensor, a wheel encoder, a load sensor, a humidity sensor, an inertial measurement unit, a magnetic sensor, an inclination sensor, a compass, a sound sensor, a pressure sensor, a Wi-Fi-connection and/or -signal sensor, a mobile phone connection sensor, a baby phone signal sensor, a radio signal sensor, a color sensor, a UV sensor, a radiation sensor, a barometric pressure sensor, or any other sensor. In particular, the further sensor may be related to the task, thus the sensor may be configured for determining at least one further parameter related to the task, such as for example the particle sensor for sensing a quantity of incoming particles when vacuum cleaning. Alternatively, the further sensor may be non-task related, thus determining at least one parameter not related to or independent of the task. Specifically, the further parameter may be or may comprise a quantity of particles in a fluid, for example in a cleaning water in the task of wiping, a humidity of a fluid, for example air-humidity, a quantity of particles in a gas, for example dust particles in air, a pressure of an arbitrary fluid, specifically an atmospheric pressure, a gas concentration, specifically the concentration of oxygen, carbon monoxide, ozone, carbon dioxide, or nitrogen oxides, a quality of a connection, specifically a Wi-Fi connection and/or a mobile phone connection and/or a baby phone connection and/or a radio connection, a quantity of grass, a color of grass, or other parameters of properties or characteristics of objects or environmental matter.

The autonomous device further comprises at least one task unit arranged to perform the household and/or commercial and/or industrial task. The term "task unit" as used herein is a broad term and is to be given its ordinary and customary meaning to a person of ordinary skill in the art and is not to be limited to a special or customized meaning. The term specifically may refer, without limitation, to a part and/or a combination of parts configured for performing the task. Specifically, the task unit may be or may comprise matters to perform the task, such as for example a vacuum cleaner for vacuum cleaning.

Further, the autonomous device comprises at least one electronics unit, configured to generate a map using the location information.

The term "electronics unit" as used herein is a broad term and is to be given its ordinary and customary meaning to a person of ordinary skill in the art and is not to be limited to a special or customized meaning. The term specifically may refer, without limitation, to an arbitrary device being capable of performing logical operations. As an example, the electronics unit may be or may comprise at least one computer, at least one computer network or at least one data processing device, such as a processor, preferably with software or hardware programming for performing the at least one logical operation. Additionally or alternatively, the electronics unit, as an example, may comprise an application-specific integrated circuit (ASIC). The electronics unit may further comprise one or more additional devices, such as one or more data storage devices and/or interfaces.

The term "map" as used herein is a broad term and is to be given its ordinary and customary meaning to a person of ordinary skill in the art and is not to be limited to a special or customized meaning. The term specifically may refer, without limitation, to a data structure having a plurality of variable elements, the variable elements being assigned to or related to location information. Thus, as an example, the map may contain a plurality of elements, the elements being variables the value of which may be adapted or changed, wherein each element may be addressed or identified by location information. As an example, the map may contain an array or a field or another data structure capable of implementing the above-mentioned functionality of a map.

Specifically, a map of an area covered or traveled across by the autonomous device while performing the task may be generated. Therein, location information, as an example, may be generated continuously or in discrete steps. The location information used for identifying the elements of the map may be a group of items of spatial information from the area covered or traveled across by the autonomous device while performing the task. As an example, each element of the map may be uniquely identified by at least one item of spatial information from the area covered or traveled across by the autonomous device while performing the task.

In particular, a considered area for creating the map, such as for example a parameter map and a statistical map as will be described in further detail below, may for example only comprise an accessible area $A_a$, e.g. an accessible area of a room, specifically an area that the autonomous device may actually be able to travel across or drive through. Thus, as an example, in case a location information such as a position of the autonomous device is determined by using the spatial sensor, e.g. a distance sensor, for example a distance sensor measuring walls of the room, e.g. by using a triangulation sensor, such as for example in Neato Botvac D4™ model, an area $A_w$ within the walls or physical boundaries as for example detected by the sensor may specifically be larger than the accessible area $A_a$, such that $A_w \geq A_a$. Specifically, the area accessible to the autonomous device may be reduced by various obstacles, such as plants or furniture such as chairs in case the task performed by the autonomous device is a task performed indoors. Closed doors may for example prevent the autonomous device from entering thereby denying access to whole rooms. These obstacles may for example, prevent the autonomous device from accessing the whole area $A_w$ within the walls or boundaries, e.g. the whole area within walls as detected by the spatial sensor.

Further, the accessible area $A_a$ may for example be subject to change, due to movement of the obstacles. In particular, the accessible area $A_a$ may be or may comprise the area covered or traveled across by the autonomous device at least once, specifically the area which the autonomous device was able to access at least once, for example, at least once within a given time interval.

The electronics unit further is configured for connecting the further parameter to the location information and adding the location of the further parameter to the map, thereby creating a parameter map containing location-correlated values of the at least one further parameter. The term "parameter map" as used herein is a broad term and is to be given its ordinary and customary meaning to a person of ordinary skill in the art and is not to be limited to a special or customized meaning. The term specifically may refer, without limitation, to a map as defined above, wherein the elements of the map contain the values of the at least one further parameter, assigned to location information. Thus, as an example, the elements and preferably each element of the parameter map may contain at least one item of location information, e.g. as a unique identifier, and, further, at least one value of the at least one further parameter, the value being assigned to the location information. Specifically, the parameter map may comprise both information on the value of the parameter and the location information indicating where the value of the parameter was determined.

The map, specifically the map of the area $A_a$, may for example be divided into one or more sub-areas $A_s$, such as by spatial discretization. Thus, specifically, the accessible area $A_a$, for example being a continuous area, may specifically be transferred into numerous discrete counterparts, e.g. sub-areas $A_s$. As an example, a sum of all sub-areas $A_s$ may equal the accessible area $A_a$, such that $\Sigma(A_s)=A_a$. In particular, the spatial discretization may for example be or may comprise a regular discretization or a scattered discretization or a mixture thereof. The at least one sub-area $A_s$ may specifically be equal to or larger than an active area or measurement area, for example a smallest unit area Au, of the spatial sensor and/or of the further sensor, specifically of one or both of the spatial sensor used for generating the location information and the further sensor used for determining the at least one further parameter. Further, the at least one sub-area $A_s$ may specifically be equal to or smaller than half of the accessible area $A_a$. As an example, one sub-area may have a size in the range of $0.1\ cm^2 \leq A_s \leq 50\ m^2$, specifically in the range of $0.5\ cm^2 \leq A_s \leq 5\ m^2$, more specifically in the range of $1\ cm^2 \leq A_s \leq 1\ m^2$. Thus, as an example, the one sub-area may for example have a size of at least one tenth of an area of the autonomous device and may have a size smaller or equal 50 times the area of the autonomous device.

The sub-areas $A_s$ may, for example, have one or more of a triangular, quadratic, or polygonal shape. In particular, the sub-areas $A_s$ may vary in shape. Thus, as an example, the shape of sub-areas at an edge or border of the accessible area $A_a$ may differ from the shape of sub-areas within a center of the accessible area $A_a$. In particular, the sub-areas at the edge or border of the accessible area $A_a$ may, for example, match the shape of the edge or border of the part of the accessible area represented by the sub-area. Specifically, the sub-areas at the edge or border of the accessible area $A_a$ may be identical to the shape of the accessible area $A_a$. Thus, in particular, the shape of the sub-areas at the edges of the map may match, e.g. be identical to, a shape of the walls or other physical boundaries of travel of the autonomous device.

Further, a temporal discretization may be used, for example additionally or alternatively to a spatial discretization. Thus, the accessible area $A_a$, specifically the timely continuous accessible area, may be temporally discretized. In particular, the accessible area $A_a$ may be determined at a time or point in time i as well as at a time i+1, wherein i and i+1 may differ by exactly one time interval $\Delta t$. As an example, the time interval used in a temporal discretization may last from several minutes to several weeks. Thus, the time interval $\Delta t$ may be in the range of $1\ s \leq \Delta t \leq 3$ months, more specifically 1 minute $\leq \Delta t \leq 1$ week. The time interval $\Delta t$, for example as a lower bound, may specifically last at least the duration for creating at least one tenth of the map. Further, the time interval $\Delta t$, e.g. as an upper bound, may be three months. As an example, typical time intervals for autonomous robots, e.g. for household robots, may specifically be approximately four hours long. Thus, the time interval $\Delta t$ may, for example, be categorized into morning, midday, evening, night, or the like. Additionally or alternatively, the time interval $\Delta t$, for example for household robots, may be centered around typical mealtimes, for example predefined mealtimes, in particular mealtimes which may be programmable by a user. Further, the time interval $\Delta t$ may specifically be a complete day. However, the length of the time interval $\Delta t$ may for example vary or may have a different length over any number of time intervals. Thus, $\Delta t$ may for example vary in length depending on weekdays or weekends. As an example, $\Delta t$ may have a different time length for Monday to Friday than for Saturday to Sunday.

The electronics unit may further be configured to store the parameter map. Specifically, the electronics unit may be configured for storing the parameter map, such that the parameter map may be available after resetting and/or charging and/or restarting the autonomous device. Thus, the autonomous device may be configured to comprise a performing of the following steps:
 (i) determining the location information and the at least one further parameter;
 (ii) generating the parameter map indicating the location of the at least one determined further parameter; and
 (iii) storing the map, such that the map is available after a reset and/or a charging and/or a restart of the autonomous device.

The at least one further parameter may be directly connected to the household and/or commercial and/or industrial task. Specifically, the parameter may be directly related to the task. As an example, the parameter may be or may comprise information related to the task itself, such as a quantity of particles gathered when vacuum cleaning.

The autonomous device may further be an autonomously moving robot and/or an autonomous guided vehicle. In the following, when referring to an autonomously moving robot, the option of the autonomously moving robot being or comprising an autonomous guided vehicle shall be included. Specifically, the autonomously moving robot may be selected from the group consisting of a household robot, for example a cleaning robot; a commercial robot; an industrial robot, specifically a manufacturing robot. Particularly, the autonomously moving robot may be able to change its position on its own or by itself. Specifically, performing the task may involve physically moving, such as for example driving through a living room in order to vacuum the living room. Thus, as an example, the moving robot may move autonomously, thereby, for example, powered by an electric supply such as a battery.

Further, the at least one further parameter may be indirectly connected to the household and/or commercial and/or industrial task. Specifically, the parameter may be indirectly related to the task, thus the parameter may comprise information indirectly related to the task. Particularly, the parameter may be or may comprise information on ambient conditions or means influencing the task. As an example, when wiping a surface, the parameter may comprise an air temperature or a temperature of the surface influencing the task of wiping by controlling an evaporation of cleaning water.

Alternatively, the at least one further parameter may not be connected to the household and/or commercial and/or industrial task. Specifically, the parameter may comprise information not related to the task. Particularly, the parameter may be or may comprise information on ambient conditions or means not directly and not indirectly connected to the task.

The electronics unit may be configured to add information to the parameter map. Specifically, the electronics unit may be configured to add one or more further or additional parameters to the parameter map.

The electronics unit may further be configured to extract statistical information from the parameter map. The term "statistical information" as used herein is a broad term and is to be given its ordinary and customary meaning to a person of ordinary skill in the art and is not to be limited to a special or customized meaning. The term specifically may refer, without limitation, to numerical facts extracted from a set of data. Particularly, the statistical information may numerically quantify a probability of an occurrence of a value within the set of data. Additionally or alternatively, the statistical information may identify an order or a regularity within the set of data. As an example, the statistical information extracted from the parameter map may be or may comprise information on a distribution of the at least one parameter in the parameter map, such as for example a pattern of a distribution of dirt and/or dust in the map. Specifically, as an example, the statistical information may comprise an average value of the at least one parameter. The statistical information may preferably be extracted from the parameter map comprising the location related parameter values of a plurality of performances of the task by the autonomous device.

The statistical information specifically may be or may comprise one or more of: information on a distribution of the at least one parameter measured during different time intervals within at least one spatial interval; information on a distribution of the at least one parameter measured in different spatial intervals during at least one time interval; information on a distribution of the at least one parameter measured during different time intervals within different spatial intervals. Thus, statistics may be made over one or more of: spatially neighboring values of the parameter during one or more runs; a plurality of values of the parameter acquired at one and the same place over a plurality of runs; a plurality of values of the parameter acquired over a plurality of runs at a plurality of locations. Therein, for acquisition and evaluation of the at least one parameter, spatial intervals and/or time intervals may be defined. Thus, as an example, spatial intervals may be defined since the autonomous device typically has an uncertainty or error with respect to positioning and/or determining its position and therefore, typically, does not exactly pass one and the same spot repeatedly. By defining spatial intervals, this spatial uncertainty may be compensated for. Similarly, time intervals may be defined. The autonomous device may pass the respective areas, spatial intervals or locations at low speed. Specifically, the statistical information may be discretized, for example, like the location information in the map and/or the further parameters in the parameter map. In particular, the statistical information may be or may comprise discrete information, such as spatial or timely discrete statistical information.

Further, the electronics unit may be configured to store the statistical information. Specifically, the electronics unit may be configured to store the statistical information in a statistic map. Thus, as an example, the statistic map may contain location-correlated values of the at least one statistical information. Additionally or alternatively, the electronics unit may be configured to add the statistical information to the parameter map, thereby storing the statistical information in the parameter map. Specifically, the statistic map or the parameter map comprising the statistical information may indicate where, on average over time and/or space, performing the task, such as cleaning, may be most desirable.

To obtain the statistic map, as an example, data of the at least one further parameter may be summarized for all positions within one sub-area $A_s$. Specifically, the autonomous device may travel or use a different pathway every time it performs its task. Thus, as an example, an accumulated number of parameters of all sub-areas $A_s$, may specifically be a representative quantity, e.g. a significant sample for doing statistics. As an example, a path of travel of the autonomous robot may depend on multiple factors, for example, leading to a deviation from previous travel routes. In particular, a center or midpoint of the autonomous device, e.g. of a cleaning robot or lawn mowing robot, may for example not pass over the exact same position twice or within the accessible sub-area $A_s$, but instead may for example move on a path and/or on lines according to the cleaning or mowing task it performs. Specifically, in such a case, a boundary between two sub-areas may for example equal approximately half the distance of two neighboring paths or lines of travel of the autonomous device, e.g. of two lines along which the center of the robot moves when performing the task. Thus, the size of the at least one sub-area $A_s$ may depend on a path of travel of the autonomous device.

In particular, a probability distribution model may be used for obtaining the statistical information. As an example, the further parameter may be summarized by using the probability distribution model of the parameter values in space and time, in order to obtain the statistical information. The term "statistical distribution model" as used herein is a broad term and is to be given its ordinary and customary meaning to a person of ordinary skill in the art. The term may specifically, without limitation, refer to an arbitrary mathematical construct or model configured for simulating a chance or predictability of occurrence of a given event. Specifically, the statistical distribution model may be or may comprise at least one mathematical function for determining a probability of the at least one further parameter to be or to comprise a given value. In particular, the probability distribution model may be selected from the group consisting of a normal distribution, a Bernoulli distribution, a binomial distribution, a Poisson distribution, a geometrical distribution, a discrete or continuous uniform distribution. As an example, in case a uniform distribution is used, the parameter values for each sub-area may specifically be summarized by summing up all parameter values recorded for the sub-area $A_s$ and dividing them by the number of parameters. In particular, only parameter values which have been recorded within a predefined or given time interval $\Delta t$ may be considered, such as, for example, the parameter values recorded within the last week or month or the like.

In particular, different probability distribution models may be used for time and for space. The probability distribution models for time and space may differ. Specifically a first probability distribution model for the distribution over space and a second probability distribution model for the distribution over time may be used. As an example, in case of a cleaning robot, the cleanliness of an apartment may change before and after a meal and the meal may take place at a similar but not at a fixed time from day to day. Further, the meal may or may not take place or may for example be postponed. Thus, in order to take into account changes and variations over time, e.g. due to changes in household life routine, a probability distribution model for the distribution of the further parameter in time may be used.

One or both of the statistic map and the parameter map, e.g. comprising the statistical information, may specifically be resolved in both space and time. In order to resolve the statistical information in space and time, one or more parameter maps determined or created for a given time interval may be summarized in one statistic map, e.g. in a statistical parameter map. Thus, as a simple example, the statistic map, specifically the statistical parameter map, may for example be created from all maps, specifically from all parameter maps, recorded or generated within a morning interval, such as for example within the time between 6 am and 11 am. For example, a further statistical parameter map may be recorded from all maps recorded within noon interval, such as specifically within a time between 11 am and 4 pm. Additionally or alternatively, a further statistical parameter map may for example be recorded from all maps recorded within an evening interval, such as within a time between 4 pm and 9 pm, and a further statistical parameter map may be recorded from all maps recorded within a night interval, such as within a time between 9 pm and 6 am.

Further, a spatial discretization of the statistic map and/or the parameter map may be performed before performing a temporal discretization. In particular, when using the temporal discretization, the spatial discretization, in particular the summarization and/or averaging of parameter values recorded in one sub-area $A_s$, may be applied before applying the temporal discretization and the connected temporal summarization. Further, when applying the temporal discretization, the parameter values of a given sub-area $A_s$ recorded in a given time-interval may be summarized.

The use of the accessible area $A_a$ may particularly be necessary for constructing the statistic map. Specifically, using the whole area $A_w$ instead of the accessible area $A_a$ for generating the statistic map, may include summarization of the further parameter for areas which are not covered by the autonomous device, e.g. by the robot, and for which therefore no values of the further parameter may be determined or measured. Thus, averaging over sub-areas $A_s$ not comprising any further parameter values, such as the non-accessible areas, may lead to an underestimation of averaged parameter values of the sub area. Thus, when extracting statistical information from the parameter map, the accessible area $A_a$ may be used.

The electronics unit may further be configured to adjust the performance of the autonomous device using the statistical information. Specifically, the performing of the task by the autonomous device may be adjusted using the statistical information. In particular, the performance of the autonomous device, such as a process of performing the task, may be adjusted according to the statistical information. More specifically, the statistical information may be used to identify areas within the map where performing the task may be desirable more frequently than in other areas within the map. As an example, the statistical information may be used to identify dirtier areas, particularly areas with a higher particle quantity than an average particle quantity, and adjust the performance of the autonomous device in such manner, that the dirtier areas are cleaned more frequently than cleaner areas, such as areas with a lower particle quantity than the average particle quantity. Additionally or alternatively, the performance of the autonomous device may be adjusted in such manner, that the autonomous device may be able to perform a quick run, for example a cleaning of the dirty areas only. Additionally or alternatively, the performance of the autonomous device may be adjusted in such manner, that the autonomous device may be able to repeat the same task in certain locations during the same run, for example a cleaning of the dirty areas two, three, or more times during one run. Additionally or alternatively, the performance of the autonomous device may be adjusted in such manner, that the autonomous device may be able to adjust the intensity of performing the task, for example, a cleaning performance by increasing the suction flow rate for vacuuming of the dirty areas.

The electronics unit may further be configured to adjust the performance of the autonomous device in order to increase the quality of the statistical information, specifically to increase a quantity of the further parameters used for extraction of the statistical information. Specifically, the electronics unit may be configured to only consider statistical information retrieved from a sufficiently high sample size and/or a certain quality for adjusting the performance of the autonomous device. Thus, depending on the sample size and quality, the robot may not consider the statistical information, e.g. the results of a statistical extraction from the parameter map, in corresponding sub-areas but may instead be configured to adjust the performance of the autonomous device such as to influence the statistic map, for example increasing the sample size and/or quality of the statistical information. Specifically, the electronics unit may adjust the performance of the autonomous device such that the autonomous device travels some areas more frequently than others. This may lead to more accurate statistical information, due to an increased sample size, e.g. an increased quantity of further parameters determined for the area. Thus, the electronics unit may try to increase the sample of these sub-areas, by visiting them more often. As a simple example, a room where the door is usually closed such that the autonomous device, e.g. the robot, may not be able to enter, may be cleaned more frequently in the rare times when the room is accessible to the autonomous device. Additionally or alternatively, the electronics unit may be configured to adjust the autonomous device as to perform or use a standard mode within sub-areas not having sufficient sample size and/or quality.

Further, the electronics device may be configured to choose the probability distribution model according to the quantity of the further parameters, specifically according to the quality of the statistical information. In particular, an area not having sufficient sample size may indicate that a model of uniform distribution may not be applicable when extracting the statistical information. Thus, based on the variation of the sample size, or the like, the electronics unit may decide to use a different probability distribution model.

Further, the electronics unit may be configured to retrieve location related environmental condition information from the statistical information. Specifically location correlated values of the environmental condition may be retrieved from the statistical information. Particularly, the electronics unit may be configured to retrieve the location related environmental condition information from the statistical information by evaluating and/or interpreting the statistical information. The term "environmental condition information" as used herein is a broad term and is to be given its ordinary and customary meaning to a person of ordinary skill in the art and is not to be limited to a special or customized meaning. The term specifically may refer, without limitation, to arbitrary data comprising information on a circumstance or state of an immediate object or ambient matter.

As an example, the environmental condition information may be or may comprise an air quality that may be retrieved from the statistical information, such as a composition of the air or a particle density within the air or the air temperature or the air humidity or an atmospheric pressure or a combination thereof. A condition of a grass or lawn, for example, may be retrieved by evaluating an occurrence of color, for example an occurrence of a green or brown color of the grass within the lawn. Further examples of environmental conditions may be or may comprise strength of a mobile phone connection and/or a Wi-Fi signal strength and/or a strength of a baby phone or radio reception.

The electronics unit may further be configured to generate recommendation information from the location related environmental condition information. The term "recommendation information" as used herein is a broad term and is to be given its ordinary and customary meaning to a person of ordinary skill in the art and is not to be limited to a special or customized meaning. The term specifically may refer, without limitation, to information comprising instructions and/or advice on a behavior or a practice. As an example, the recommendation information may comprise information on advantageous behavior in designated areas within the map, wherein the designated area may be at least part of an area of application of the autonomous device such as an area within the generated map. The recommendation information may comprise advantageous suggestions to be applied in the designated areas, such as for example a recommendation to ventilate, air-condition or heat an area or room within a house or building, or a recommendation to water plants, specifically a recommendation to apply water to grass or lawn.

Further, the autonomous device may comprise an interface. Specifically, an interface configured to allow an information transfer to an external device. In particular, the information may be selected from a group consisting of: the map; the parameter map; the statistical information; the environmental condition information; the recommendation information.

The external device may be or may comprise a control network configured to fully or partially implement the recommendation information. Specifically, the external device may be a household control network. As an example, the interface may be configured to allow the transfer of information to the external device controlling thermostats, air-conditions, window blinds, watering systems, or the like. Thus, the recommendation information may be automatically implemented by the external device.

Additionally or alternatively, the external device may be or may comprise a user device configured to fully or partially inform a user about the recommendation information. For example, the user device may use visual and/or audio communication to inform the user about the recommendation information and/or to display the map and/or the parameter map and/or the statistical information and/or the statistic map. Specifically, the user device may be or may comprise a mobile or a permanently installed device, such as for example a control panel being part of the household control network, a smartphone, a tablet, or the like.

The autonomous device further comprises an evaluation system. The term "evaluation system" as used herein is a broad term and is to be given its ordinary and customary meaning to a person of ordinary skill in the art. The term specifically may refer, without limitation, to an arbitrary electronic device or circuit being configured, by hardware and/or by software, for performing at least one numerical calculation. As an example, the evaluation system may comprise at least one processor, e.g. a processor with one or more data storage devices, with software instructions for performing the at least one numerical simulation. In particular, the evaluation system of the autonomous device may be configured to plan a path of travel of the autonomous device. For path planning, a solution of an Eikonal-equation may be used, such as an Euler-path, wherein the autonomous device, e.g. the robot, may follow the Euler path when performing the task. Specifically, the Euler-path may correspond to a path of travel of the autonomous device which, when followed, leads to coverage of the whole accessible area $A_a$, e.g. the area the autonomous device is supposed to cover or travel across when performing the task, without passing any sub-area twice. However, in many cases, following or finding an Eulerpath may not be possible. In particular, objects that have not been present during planning of the path may make following the Euler path impossible. Further, for some areas an Euler path does not exist. Thus, for areas where following or finding an Euler path is impossible, the autonomous device may follow a path or track where some sub-areas may have to be passed more than once.

Specifically, in case the at least one further parameter indicates that the task of the autonomous device needs to be performed in a more intense way in some sub-areas, the sub-areas that may need to be passed or travelled across more than once, may be chosen to be the sub-areas that need a more intense task performance. Further, in case the autonomous device may pass or travel across an area for which the statistical information indicates no task performance being required, the evaluation system, e.g. the electronics unit, of the autonomous device may be configured to re-plan the path of travel as to include sub-areas in which task performance is required, e.g. in a more intense way. Thereby, a total time needed for performing the task may be reduced.

In particular, the calculations which may be necessary for planning the path of travel of the autonomous device and for determining one or both of the statistic map and the parameter map may be computationally demanding. Specifically, the calculations may be too demanding to be performed on board of the autonomous device. Thus, the evaluation system may fully or partially be arranged externally. In particular, the evaluation system may be one or more of; the electronics unit; a cloud based system; an external computer or computer network. As an example, the recorded data, e.g. the parameter map, the statistic map or the like, may be transmitted to the cloud based system or the external computer or computer network, where the calculations may fully or partially be performed and where, as an example, the data may further be used for product optimization and or commercial purposes.

Generally, knowing which areas may need more intense task performance may for example allow a better planning of routes or paths. In particular, the autonomous device may need less time for performing the at least one task when following planned paths than unplanned or random paths. As an example, the user may be informed about a total time reduced by planning the routes or paths of travel of the autonomous device when performing the task. Thus, a reduced time as a result of path planning and optimization may be indicated as an output to the user, for example via the external device.

In particular, artificial intelligence algorithms such as neural networks or the like may be used to assess correlations in one or both of the parameter map and the statistic map concerning temporal and spatial resolution.

As an example, the autonomous device may specifically be floor bound. Thus, the autonomous robot may for example be a floor bound robot. Specifically, the autonomous robot may comprise means for moving on a floor, such as wheels continuous tracks, or the like. However, alternatively, the autonomous device may, for example, be a flying robot. Thus, the autonomous device may specifically comprise means for flying.

The autonomous device may be an indoor robot. Thus, the autonomous device may be configured for performing indoor tasks, such as tasks performed indoors, e.g. within a building. However, the autonomous robot may also be configured for performing outdoor tasks, such as tasks performed outside, e.g. outside of a building, house or shelter.

In a further aspect of the invention, a method for controlling an autonomous device configured for performing at least one task selected from a household task, a commercial task and an industrial task, is disclosed. The method comprises the following steps, which may be performed in the given order. However, a different order may also be possible. Further, one or more than one or even all the method steps may be performed once or repeatedly. Further, the method steps may be performed in a timely overlapping fashion or even in parallel. The method may further comprise additional method steps which are not listed.

The method comprises the following steps:

a) generating location information by using at least one spatial sensor;

b) determining at least one further parameter by using at least one further sensor;
c) generating a map using the location information; and
d) connecting the further parameter to the location information and adding the location of the further parameter to the map, thereby creating a parameter map containing location-correlated values of the at least one further parameter.

For further possible definitions of most of the terms used herein, reference may be made to the description of the autonomous device as disclosed above or as disclosed in further detail below. Specifically, the method for controlling an autonomous device may comprise controlling the autonomous device as disclosed in the first aspect of the present invention.

The method may further comprise storing the map and/or the parameter map. Thereby, availability of the map and/or the parameter map after a reset and/or a charging and/or a restart of the autonomous device may be provided.

Further, the method may comprise adding information to the parameter map. Thus, the method may specifically comprise expanding the parameter map by adding additional information to the parameter map.

The method may further comprise extracting statistical information from the parameter map. Specifically, the method step of extracting statistical information from the parameter map may comprise creating a statistic map containing location correlated values of the statistical information. In particular, extracting statistical information may comprise creating a map that indicates where, on average a performing of the task may be most desirable, for example, where on average cleaning and/or mowing and/or heating and/or ventilation and/or air conditioning is needed the most. The method step of extracting statistical information may further comprise storing the statistic map.

Additionally or alternatively, the method step of extracting statistical information may comprise averaging the information contained in the parameter map. The term "averaging" as used herein is a broad term and is to be given its ordinary and customary meaning to a person of ordinary skill in the art and is not to be limited to a special or customized meaning. The term specifically may refer, without limitation, to determining an average value representing a quantity intermediate to a set of quantities. Specifically, averaging a quantity may indicate determining a value that represents or approximates an arithmetic mean of the quantity.

Further, the method step of extracting statistical information may comprise determining anomalies in parameter values and/or correlating locations. The term "anomaly" as used herein is a broad term and is to be given its ordinary and customary meaning to a person of ordinary skill in the art and is not to be limited to a special or customized meaning. The term specifically may refer, without limitation, to a deviation from a common or usual set of values. Particularly, the values within the set of values showing a greater deviation than the standard deviation values may be identified as anomalies, wherein the standard deviation may be used to quantify the amount of variation or dispersion of the set of values. More particularly, the values showing larger deviations from the average value of the parameter than usual, such as deviations larger than the standard deviation, may be identified as being anomalies. Thus, the method step of extracting statistical information may specifically comprise determining locations where the determined parameter outstandingly differs from the average of the determined parameter.

The method may further comprise extracting environmental condition information from the statistical information. Specifically, the method step of extracting environmental condition information may comprise creating and/or storing an environmental map containing location correlated values of the environmental condition information.

The method, such as the method step of extracting environmental condition information, may further comprise determining anomalies of the parameter values and/or the correlating locations. Thus, specifically, the method step of extracting environmental condition information may comprise determining areas or locations where the determined parameter outstandingly differs from the average of the statistical information of the determined parameter.

The method may further comprise generating recommendation information from the environmental condition information. Specifically, as outlined above, the recommendation information may comprise instructions on advantageous behavior.

Further, the method may comprise transferring information to an external device. The information specifically may be selected from a group consisting of: the map; the parameter map; the statistical information; the statistic map; the environmental condition information; the recommendation information.

The method may further comprise informing a user about the recommendation information by way of a user device. Specifically, the user may be informed by way of a user device as described above or as may be outlined further below.

The method further may comprise adjusting the performance of the autonomous device. Specifically, adjusting the performing of the task by the autonomous device may be comprised by the method for controlling the autonomous device.

Further disclosed and proposed herein is a computer program including computer-executable instructions for performing the method according to the present invention in one or more of the embodiments enclosed herein when the program is executed on a computer or computer network, specifically an electronics unit of an autonomous device, such as according to any one of the embodiments disclosed above or disclosed in further detail below. Specifically, the computer program may be stored on a computer-readable data carrier. Thus, specifically, one, more than one or even all of method steps a) to d) as indicated above may be performed by using a computer or a computer network, preferably by using a computer program.

Further disclosed and proposed herein is a computer program product having program code means, in order to perform the method according to the present invention in one or more of the embodiments enclosed herein when the program is executed on a computer or computer network, such as on an electronics unit of an autonomous device. Specifically, the program code means may be stored on a computer-readable data carrier.

Further disclosed and proposed herein is a data carrier having a data structure stored thereon, which, after loading into a computer or computer network, such as into an electronics unit of an autonomous device, such as into a working memory or main memory of the computer or computer network, may execute the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network, such as on an electronics unit of an autonomous device. As used herein, a computer program product refers to the program as a tradable product. The product may generally exist in an arbitrary format, such as in a paper format, or on a computer-readable data carrier. Specifically, the computer program product may be distributed over a data network.

Finally, disclosed and proposed herein is a modulated data signal which contains instructions readable by a computer system or computer network, such as an electronics unit of an autonomous device, for performing the method according to one or more of the embodiments disclosed herein.

Referring to the computer-implemented aspects of the invention, one or more of the method steps or even all of the method steps of the method according to one or more of the embodiments disclosed herein may be performed by using a computer or computer network, such as an electronics unit of an autonomous device. Generally, these method steps may include any of the method steps, typically except for method steps requiring manual work, such as providing the samples and/or certain aspects of performing the actual measurements.

Specifically, further disclosed herein are:
- a computer or computer network comprising at least one processor, wherein the processor is adapted to perform the method according to one of the embodiments described in this description,
- a computer loadable data structure that is adapted to perform the method according to one of the embodiments described in this description while the data structure is being executed on a computer,
- a computer program, wherein the computer program is adapted to perform the method according to one of the embodiments described in this description while the program is being executed on a computer,
- a computer program comprising program means for performing the method according to one of the embodiments described in this description while the computer program is being executed on a computer or on a computer network,
- a computer program comprising program means according to the preceding embodiment, wherein the program means are stored on a storage medium readable to a computer,
- a storage medium, wherein a data structure is stored on the storage medium and wherein the data structure is adapted to perform the method according to one of the embodiments described in this description after having been loaded into a main and/or working storage of a computer or of a computer network, and
- a computer program product having program code means, wherein the program code means can be stored or are stored on a storage medium, for performing the method according to one of the embodiments described in this description, if the program code means are executed on a computer or on a computer network.

The device and method according to the present invention may provide a large number of advantages over known methods and devices for performing at least one task selected from a household task, a commercial task and an industrial task. Thus, specifically, performing the at least one task as suggested in the present document may be less time-consuming, compared to performance processes known in the art. In particular, the present invention may optimize the performance of the task, for example optimize a behavior of the autonomous device so it performs the task more efficiently than for example robots known from the art. Specifically, the suggested autonomous device may be configured for cleaning dirtier areas more frequently or performing quick runs, cleaning only dirty areas, thereby improving task performance efficiency compared to devices known from the art.

Further, the suggested device and method may have extended remits compared to devices and methods known in the art. Specifically, the device and method according to the present invention may have additional areas of responsibility besides performing the task. In particular, a parameter map, specifically a parameter map with local sensor data, is generated. Thus, as an example, the parameter map may be used to analyze an air quality, thereby possibly identifying a danger of mold or other threats usually only noticed on occurrence. Thus, the present invention may further provide health support. Specifically, health support may be provided by generating recommendation information, such as information on, for example, which room needs better ventilation, which area should be air-conditioned or heated differently. Additionally or alternatively, the suggested device and method may provide health support by actively prevent the occurrence of danger, such as the occurrence of mold, by transferring the recommendation information to an external device. Specifically, the external device may be configured for implementing the recommendation information and/or executing the recommendations directly, such as for example a household control network, controlling thermostats, air-conditions, window blinds, watering systems, and the like.

In particular, the suggested devices and methods may be able to extract and use statistical information as opposed to devices and methods known in the art, for example opposed to the method disclosed in DE 10 2007 010 979 B3. Specifically, the extraction and use of statistical information may improve task performance, for example, by identifying patterns or regularities within a set of data, such as a pattern of a distribution of dirt and/or dust within the map, e.g. within the parameter map. Thus, for the suggested methods and devices, performing the task may be adjusted according to the statistical information, which may improve the task performance compared to known methods and devices. Additionally or alternatively, the extraction and use of statistical information of the suggested devices and methods may lead to an increased or extended field of application compared to methods and devices known in the art, in particular, compared to the method disclosed in DE 10 2007 010 979 B3.

Further, the suggested devices and methods may provide more reliable information than devices and methods known in the art. Specifically, the statistical information which may be extracted in proposed methods and devices may for example be much more reliable than information gathered in single measurement cycles, such as for example information gathered in DE 10 2007 010 979 B3. In particular, the suggested methods and devices may for example reliably filter out insignificant occurrences. Thus, as opposed to known methods and devices, the present methods and devices may not give any attention to insignificant occurrences, e.g. insignificant occurrences of or within the information gathered or generated by the proposed methods and devices. Specifically, the device may be updated in every run, e.g. every time the task is performed.

Summarizing and without excluding further possible embodiments, the following embodiments may be envisaged:

Embodiment 1

An autonomous device configured for performing at least one task selected from a household task, a commercial task and an industrial task, wherein the autonomous device comprises at least one spatial sensor for generating location information and at least one further sensor for determining at least one further parameter, wherein the autonomous device further comprises at least one task unit arranged to perform the household and/or commercial and/or industrial task, and at least one electronics unit, wherein the electronics unit is configured to generate a map using the location information, wherein the electronics unit further is configured for connecting the further parameter to the location information and adding the location of the further parameter to the map, thereby creating a parameter map containing location-correlated values of the at least one further parameter.

Embodiment 2

The autonomous device according to the preceding embodiment, wherein an area considered for creating the map only comprises an accessible area $A_a$, such as an area the autonomous device can travel across or drive through.

Embodiment 3

The autonomous device according to any one of the preceding embodiments, wherein the map is spatially discretized, specifically into one or more sub-areas $A_s$, wherein the spatial discretization is a regular discretization or a scattered discretization or a mixture thereof.

Embodiment 4

The autonomous device according to any one of the preceding embodiments, wherein the map is temporally discretized.

Embodiment 5

The autonomous device according to any one of the preceding embodiments, wherein the electronics unit further is configured to store the parameter map, and wherein, specifically, the autonomous device may be configured to comprise a performing of the following steps:
(i) determining the location information and the at least one further parameter;
(ii) generating the parameter map indicating the location of the at least one determined further parameter; and
(iii) storing the parameter map, such that the parameter map is available after a reset and/or a charging and/or a restart of the autonomous device.

Embodiment 6

The autonomous device according to the preceding embodiment, wherein the at least one further parameter is directly connected to the household and/or commercial and/or industrial task.

Embodiment 7

The autonomous device according any one of the preceding embodiments, wherein the autonomous device is an autonomously moving robot selected from the group consisting of: a household robot; a commercial robot; an industrial robot, specifically a manufacturing robot.

Embodiment 8

The autonomous device according to any one of the preceding embodiments, wherein the at least one further parameter is indirectly connected to the household and/or commercial and/or industrial task.

Embodiment 9

The autonomous device according to any one of the preceding embodiments, wherein the at least one further parameter is not connected to the household and/or commercial and/or industrial task.

Embodiment 10

The autonomous device according to any one of the preceding embodiments, wherein the electronics unit is configured to add information to the parameter map.

Embodiment 11

The autonomous device according to any one of the preceding embodiments, wherein the electronics unit is configured to extract statistical information from the parameter map.

Embodiment 12

The autonomous device according to any one of the two preceding embodiments, wherein the electronics unit is configured to store the statistical information in a statistic map and/or to add the statistical information to the parameter map.

Embodiment 13

The autonomous device according to the preceding embodiment, wherein a probability distribution model is used for obtaining the statistical information, wherein the probability distribution model is selected from the group consisting of: a normal distribution; a Bernoulli distribution; a binominal distribution; a Poisson distribution; a geometrical distribution; a discrete or continuous uniform distribution.

Embodiment 14

The autonomous device according to the preceding embodiment, wherein different probability distribution models are used for space and for time.

Embodiment 15

The autonomous device according to any one of the three preceding embodiments, wherein one or both of the statistic map and the parameter map is resolved in time and in space.

Embodiment 16

The autonomous device according to the preceding embodiment, wherein a spatial discretization is performed before performing a temporal discretization.

Embodiment 17

The autonomous device according to any one of the six preceding embodiments, wherein the electronics unit is configured to adjust the performance of the autonomous device using the statistical information.

Embodiment 18

The autonomous device according to the preceding embodiment, wherein the electronics unit is further configured to adjust the performance of the autonomous device to increase the quality of the statistical information, specifically to increase a quantity of the further parameters.

Embodiment 19

The autonomous device according to any one of the six preceding embodiments, wherein the electronics unit is configured to choose the probability distribution model according to the quantity of the further parameters.

Embodiment 20

The autonomous device according to any one of the two preceding embodiments, wherein the electronics unit is configured to retrieve a location related environmental condition information from the statistical information.

Embodiment 21

The autonomous device according to the preceding embodiment, wherein the electronics unit is configured to generate recommendation information from the location related environmental condition information.

Embodiment 22

The autonomous device according to any one of the four preceding embodiments, wherein the autonomous device comprises an interface, wherein the interface is configured to allow an information transfer to an external device, wherein the information is selected from a group consisting of: the map; the parameter map; the statistical information; the environmental condition information; the recommendation information.

Embodiment 23

The autonomous device according to the preceding embodiment, wherein the external device is a control network configured to fully or partially implement the recommendation information.

Embodiment 24

The autonomous device according to any one of the two preceding embodiments, wherein the external device is a user device configured to fully or partially inform a user about the recommendation information.

Embodiment 25

The autonomous device according to any one of the preceding embodiments, wherein the autonomous device comprises an evaluation system, wherein the evaluation system is configured to plan a path of travel of the autonomous device.

Embodiment 26

The autonomous device according to the preceding claim, wherein the evaluation system is one or more of: the electronics unit; a cloud based system; an external computer or computer network.

Embodiment 27

The autonomous device according to any one of the preceding embodiments, wherein the autonomous device is a floor bound robot.

Embodiment 28

The autonomous device according to any one of the preceding embodiments, wherein the autonomous device is an indoor robot.

Embodiment 29

The autonomous device according to any one of the preceding embodiments, wherein the autonomous device is configured for performing outdoor tasks.

Embodiment 30

The autonomous device according to any one of the preceding embodiments, wherein the autonomous device is a flying robot.

Embodiment 31

A method for controlling an autonomous device configured for performing at least one task selected from a household task, a commercial task and an industrial task, the method comprising:
 a) generating location information by using at least one spatial sensor;
 b) determining at least one further parameter by using at least one further sensor;
 c) generating a map using the location information; and
 d) connecting the further parameter to the location information and adding the location of the further parameter to the map, thereby creating a parameter map containing location-correlated values of the at least one further parameter.

Embodiment 32

Method according to the preceding embodiment, wherein the method comprises using the autonomous device according to any one of the preceding embodiments referring to an autonomous device.

Embodiment 33

Method according to any one of the preceding method embodiments, wherein the method further comprises storing the map and/or the parameter map, thereby providing availability of the map and/or the parameter map after a reset and/or a charging and/or a restart of the autonomous device.

Embodiment 34

Method according to any one of the preceding method embodiments, wherein the method further comprises adding information to the parameter map.

Embodiment 35

Method according to any one of the preceding method embodiments, wherein the method further comprises extracting statistical information from the parameter map.

Embodiment 36

Method according to the two preceding embodiments, wherein the method further comprises storing the statistical information in a statistic map and/or adding the statistical information to the parameter map.

Embodiment 37

Method according to any one of the two preceding embodiments, wherein the method step of extracting statistical information comprises creating a statistic map containing location correlated values of the statistical information, wherein the method step extracting statistical information further comprises storing the statistic map.

Embodiment 38

Method according to the preceding embodiment, wherein the method step of extracting statistical information comprises averaging the information contained in the parameter map.

Embodiment 39

Method according to any one of the four preceding embodiments, wherein the method step of extracting statistical information comprises determining anomalies in parameter values and/or correlating locations.

Embodiment 40

Method according to any one of the five preceding embodiments, wherein the method further comprises extracting environmental condition information from the statistical information.

Embodiment 41

Method according to the preceding embodiment, wherein the method step of extracting environmental condition information comprises creating and/or storing an environmental map containing location correlated values of the environmental condition information.

Embodiment 42

Method according to any one of the two preceding embodiments, wherein the method comprises generating recommendation information from the environmental condition information.

Embodiment 43

Method according to the preceding embodiment, wherein the method comprises transferring information to an external device, wherein the information is selected from a group consisting of: the map; the parameter map; the statistical information; the environmental condition information; the recommendation information.

Embodiment 44

Method according to any one of the two preceding embodiments, wherein the method comprises informing a user about the recommendation information by way of a user device.

Embodiment 45

Method according to any one the preceding method embodiments, wherein the method further comprises adjusting the performance of the autonomous device.

Embodiment 46

A computer program including computer-executable instructions for performing the method according to any one of the preceding embodiments referring to a method when the program is executed on a computer or computer network, specifically on an electronics unit of an autonomous device, more specifically on the electronics unit of the autonomous device according to any one of the preceding embodiments referring to an autonomous device.

SHORT DESCRIPTION OF THE FIGURES

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

DETAILED DESCRIPTION OF THE EMBODIMENTS

Figure 1:
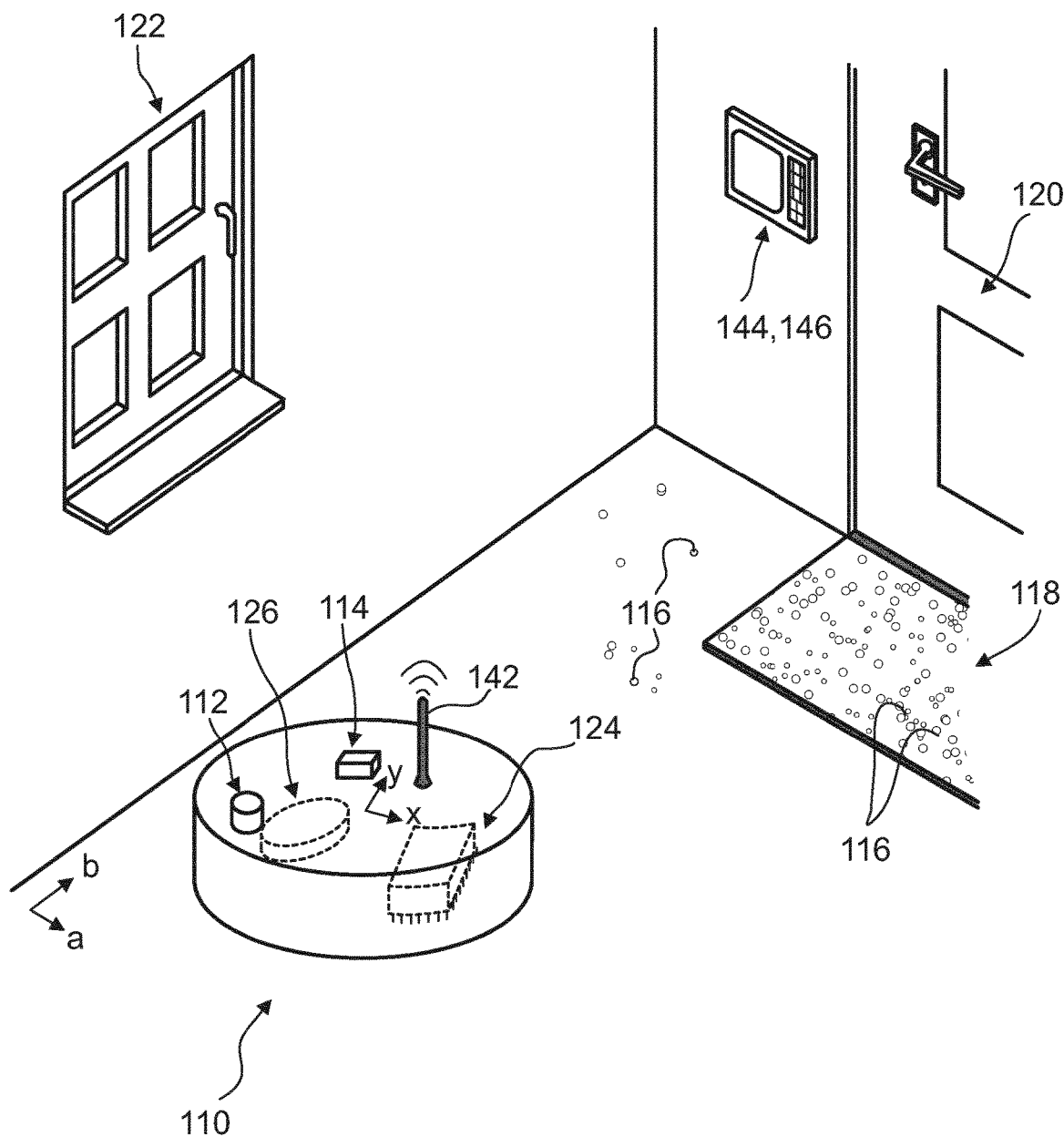
FIG. 1 illustrates a perspective view of an embodiment of an autonomous device performing a task.

In FIG. 1 an embodiment of an autonomous device 110 configured for performing at least one task is illustrated in a perspective view, the autonomous device 110 performing the task. Specifically, FIG. 1 may illustrate the autonomous device 110 performing the task within a hallway.

The autonomous device 110 comprises at least one spatial sensor 112 for generating location information. The location information may specifically be related to a spatial position and/or orientation of the autonomous device 110 in space. Particularly, the location information may be or may comprise information specifying the position and/or orientation of the autonomous device 110 within a spatial reference system, such as a Cartesian coordinate system for example an a-b-coordinate system illustrated in FIG. 1. For this purpose, a second spatial reference system, such as a second Cartesian coordinate system for example an x-y-coordinate system may be fixed to the autonomous device 110, as also shown in FIG. 1.

The autonomous device 110 may be an autonomously moving robot. Specifically, as illustrated in FIG. 1, the autonomous device 110 may be a cleaning robot, such as a vacuum cleaning robot. Particularly, the autonomously moving robot may be able to change its position on its own or by itself. Specifically, performing the task may involve physically moving. Thus, as illustrated in FIG. 1, performing the task may involve driving through an area, for example the hallway, in order to vacuum the area, e.g. the hallway.

The autonomous device comprises at least one further sensor 114 for determining at least one further parameter. As an example, the parameter may be or may comprise a quantity of particles 116 gathered when vacuum cleaning. Specifically, as illustrated in FIG. 1, the parameter may be or may comprise the quantity of particles 116 on a floor of the hallway, including a doormat 118 next to a front door 120. As a further example illustrated in FIG. 1, the parameter may be or may comprise an air temperature within the hallway, including the air underneath a window 122.

Figure 2A:
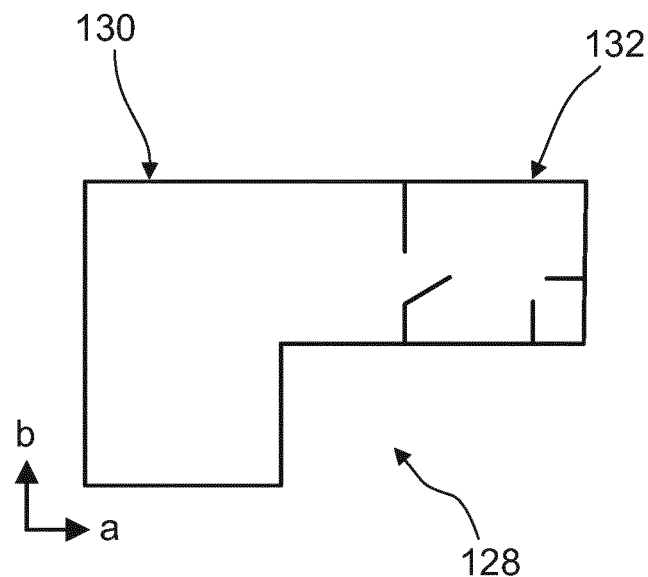
FIGS. 2A and 2B shows embodiments of a map (2A) and a statistic map (2B) generated by the autonomous device.

The autonomous device 110 further comprises at least one task unit 124 arranged to perform the household and/or commercial and/or industrial task. Specifically, as illustrated in FIG. 1 the task unit 124 may be arranged for vacuum cleaning an area, such as a room, hallway, kitchen, bathroom, or any other area. Further, the autonomous device 110 comprises at least one electronics unit 126, configured to generate a map 128 using the location information. The location information may for example be presented within a spatial reference system, for example within the a-b-coordinate system. An embodiment of the map 128 is illustrated in FIG. 2A. The map 128 may specifically comprise location information of an area covered or traveled across by the autonomous device 110 while performing the task. In particular, as illustrated in FIG. 2A, the map 128 has an outline of the area accessible to the autonomous device 110. Specifically, as illustrated, the area may comprise two adjacent rooms, a first room 130, e.g. the hallway as partially illustrated in FIG. 1, and a second room 132, for example a bathroom having a shower area.

Further, the electronics unit 126 is configured for connecting the at least one further parameter to the location information and adding the location of the further parameter to the map 128. Thereby, the electronics unit 126 is creating a parameter map containing location correlated values of the at least one further parameter. Specifically, the electronics unit 126 may, for example, extend the map 128 to become the parameter map.

The electronics unit 126 may further be configured to add information to the parameter map. Specifically, the electronics unit 126 may be configured to add further or additional parameters to the parameter map. Thus, the parameter map may comprise information on more than one parameter and the respective location of determination of the parameter. For example, the parameter map may comprise information on a particle density within the air, an air temperature, a floor humidity, a ground humidity, an air humidity, an atmospheric pressure, a battery power, a change in battery power, a voltage, a current, a power demand, a gas composition, a gas concentration such as a carbon monoxide, carbon dioxide, oxygen, or ozone concentration, any further parameter and/or a combination thereof. The electronics unit 126 may further be configured to store the parameter map. Specifically, the electronics unit 126 may be configured for storing the parameter map, such that the parameter map may be available after resetting and/or charging and/or restarting the autonomous device 110.

The electronics unit 126 may further be configured to extract statistical information from the parameter map. Particularly, the statistical information extracted from the parameter map may be or may comprise information on a distribution of the at least one parameter in the parameter map, such as for example a pattern of a distribution of dirt and/or dust in the map. Preferably, the statistical information may be extracted from the parameter map comprising the location related parameter values of a plurality of performances of the task by the autonomous device.

Figure 2B:
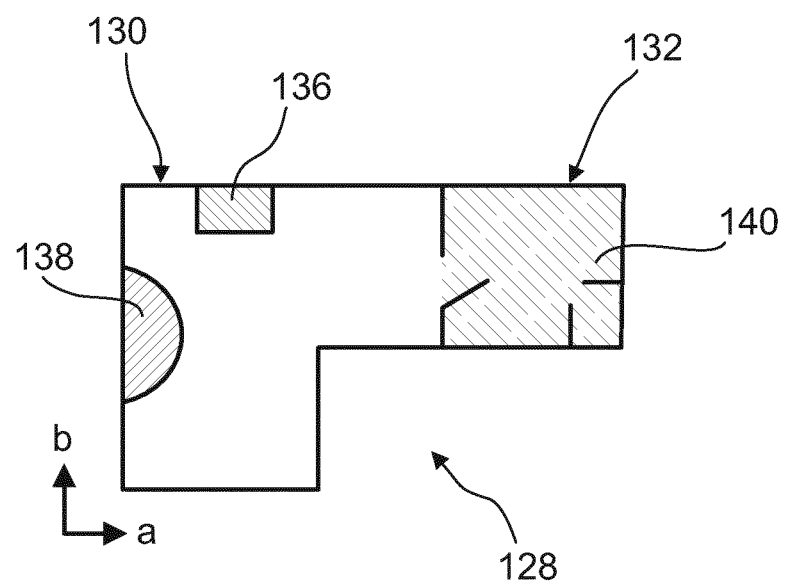

Further, the electronics unit 126 may be configured to store the statistical information. Specifically, the electronics unit may be configured to store the statistical information in a statistic map 134 or in the parameter map by adding the statistical information to the statistic map. Thus, as an example, the statistic map may contain location-correlated values of the at least one statistical information. An embodiment of the statistic map 134 is illustrated in FIG. 2B. The statistic map 134 comprising the statistical information may particularly indicate where, on average, performing the task, such as cleaning, may be most desirable.

Further, the electronics unit 126 may be configured for estimating a remaining operation time of the autonomous device 110 and/or of a battery of the autonomous device 110. Thus, as an example, by evaluating one or more of a change in a battery charge status, an electrical power demand of an engine of the autonomous device 110 or a slippage of wheels of the autonomous device 110, a present demand of the autonomous device 110 for movement may be derived. By using this information, the electronics unit 126 may estimate or extrapolate, as an example, how far and/or how long the autonomous device 110 may be operated further. Therein, additional information may be taken into consideration for the estimation, such as a power consumption for the household task, e.g. for the cleaning. The at least one further parameter and the parameter map may also be taken into consideration, e.g. in order to estimate a power consumption for performing the household task. As an example, by using the parameter map or other information, the future power consumption for cleaning specifically dirty areas may be estimated and/or may be taken into consideration for estimating the remaining operating time. Overall, this estimation allows for planning a remaining operating time and/or operation area for the autonomous device 110.

Specifically, as illustrated in FIG. 1, the quantity of particles 116 on the doormat 118 next to the front door 120 may be higher than for example the quantity of particles 116 in adjoining areas which are less subjected to use than the doormat 118 next to the front door 120. Specifically, the quantity of particles 116 on the doormat 118 may on average be higher than the quantity of particles 116 in the adjoining areas. Thus, in the statistics map 134 illustrated in FIG. 2B, the area of the doormat 116 within the first room 130, e.g. the hallway, may be indicated as a high particle area 136. Thus, the high particle area 136 may specifically indicate an area where on average vacuum cleaning may be desirable more frequently than in other areas within the first room 130.

Furthermore, statistical information on more than one parameter may be comprised by the statistic map 134. As an example, the statistic map 134 may further comprise information on an air temperature within the area of the map 128, e.g. the first room 130 and the second room 132. Specifically, the air temperature underneath the window 122 may differ from the air temperature of adjoining areas or areas close to a heating system. Hence, the statistic map 134 may indicate the area in close proximity to the window 122 as a cold spot 138. As a further example, the statistic map 134 may further comprise information on air humidity within the area of the map 128. Particularly, the air humidity in the second room 132, such as the bathroom, may be higher than an average air humidity within the area of the map 128. Thus, the statistic map 134, as illustrated in FIG. 2B, may indicate the area within the second room 132 as a high humidity area 140.

The electronics unit 126 illustrated in FIG. 1, may further be configured to adjust the performance of the autonomous device 110 using the statistical information. Specifically, the performing of the task by the autonomous device 110 may be adjusted using the statistic map 134. The performance of the autonomous device 110 may, for example, be adjusted in such way, that the identified high particle areas 136 within the statistic map 134 may be cleaned more frequently and/or more thoroughly than areas with a lower particle quantity. Thus, the electronics unit 126 may for example modify the performance of the autonomous device 110, specifically the performing of vacuum cleaning, in such manner, that the high particle areas 136, specifically the area of the doormat 118 within the hallway, may be cleaned more frequently and/or more thoroughly than remaining areas. Hence, the autonomous device 110 may be able to perform a quick run, wherein the quick run may comprise performing the task, e.g. vacuum cleaning, in predefined desirable areas, such as the high particle areas 116, only. For example, the autonomous device 110, illustrated in FIG. 1, may be capable of performing the vacuum cleaning only in the area of the doormat 118.

Further, the electronics unit 126 may be configured to retrieve location related environmental condition information from the statistical information. Specifically, the electronics unit 126 may be configured for retrieving environmental condition information from the statistic map 134. As an example, the statistical information on the air humidity, as illustrated in FIG. 2B, may indicate an elevated and/or higher danger of mold within the bathroom or second room 132, than within the hallway or first room 130. Further, a combination of the statistical information on more than one parameter may be used in order to retrieve the location related environmental condition. For example, the statistical information on the air temperature and/or a mold spore density within the air may further be used to indicate a danger of mold. Other environmental condition information that may be retrieved from the statistical information may comprise a strength of a mobile phone connection, a noise level, a radiation level, a Li-Fi signal strength, a Wi-Fi signal strength, a strength of a baby phone or radio reception or any other information on an environmental condition. Specifically, for example in case of the task comprising mowing a lawn, the environmental condition information may comprise a condition of a grass or lawn, for example, a humidity rate of the grass which may be retrieved by evaluating an occurrence of color, for example an occurrence of a green or brown color of the grass.

The electronics unit 126 may further be configured to generate recommendation information from the location related environmental condition information. Specifically, the electronics unit 126 may be configured to generate instructions and/or advice on a behavior or a practice. Particularly, the recommendation information may comprise advantageous suggestions to be applied in the area, such as for example a recommendation to modify ventilation habits, air-condition or heat an area or room within a house or building more frequently, or a recommendation to apply water, fertilizer, insecticides, fungicides, or herbicides to plants, specifically a recommendation to apply water to grass or lawn. As an example, the recommendation information may comprise a recommendation to ventilate the second room 132 in order to reduce the danger of mold.

As illustrated in FIG. 1, the autonomous device 110 may further comprise an interface 142. The interface 142 may specifically be configured to allow an information transfer to an external device 144. Specifically, the interface 142 may be configured to transfer the statistical information, for example the statistic map 134 and/or the location related recommendation information to the external device 144. The external device 144 specifically may be or may comprise a control network configured to fully or partially implement the recommendation information. As illustrated in FIG. 1, the external device may be a household control network controlling thermostats, air-conditions, window blinds, watering systems, or the like. Thus, the recommendation information may be automatically implemented by the external device 144.

Additionally or alternatively, the external device 144 may be or may comprise a user device configured to fully or partially inform a user about the recommendation information. For example, the user device may use visual and/or audio communication to inform the user about the recommendation information. Specifically, the user device may be or may comprise a mobile or a permanently installed device, such as for example a control panel 146 being part of the household control network, as shown in FIG. 1. The user device may further comprise a smartphone, a tablet, a laptop or the like.

Figure 3:
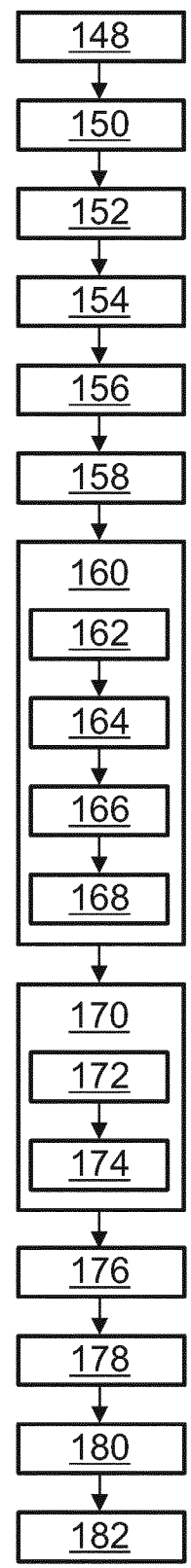
FIG. 3 shows a flow chart of a method for controlling an autonomous device.

In FIG. 3, a flow chart of a method for controlling an autonomous device 110 configured for performing at least one task selected from a household task, a commercial task and an industrial task, is illustrated. Specifically, the method may comprise controlling the autonomous device 110 illustrated in FIG. 1. The method comprises the following method steps, which may be performed in the given order. However, a different order may also be possible. Further, one or more than one or even all the method steps may be performed once or repeatedly. Further, the method steps may be performed in a timely overlapping fashion or even in parallel. The method may further comprise additional method steps which are not listed.

The method for controlling the autonomous device 110 comprises a first step a) (method step 148) generating location information by using at least one spatial sensor 112. Particularly, the spatial sensor 112 illustrated in FIG. 1 may be used. Specifically, the spatial sensor 112 may be used in order to generate information on a spatial position of the autonomous device 110. Additionally or alternatively, the spatial sensor 112 may be used to generate information on a spatial position or location of at least one object in a vicinity of the autonomous device 110, such as objects that limit an accessible area to the autonomous device 110. Thus, the object may be or may comprise for example, a wall, a door, a fence, a sofa, or any other types of barriers restricting the area accessible to the autonomous device 110.

The method further comprises step b) (method step 150) determining at least one further parameter by using at least one further sensor 114. Specifically, the further parameter may be determined by using the further sensor 114 as illustrated in FIG. 1. Further, the method comprises step c) (method step 152) generating a map 128 using the location information. Particularly, as an example, the location information may be used in order to generate the map 128 as illustrated in FIG. 2A. Furthermore, the method comprises step d) (method step 154) connecting the further parameter to the location information and adding the location of the further parameter to the map 128, thereby creating a parameter map containing location-correlated values of the at least one further parameter.

The method may further comprise method step 156, storing the map 128 and/or the parameter map. Specifically, the method step 156 may ensure availability of the map 128 and/or the parameter map after a reset and/or a charging and/or a restart of the autonomous device 110.

Further, the method may comprise method step 158, adding information to the parameter map. Thus, the method may specifically comprise expanding the parameter map by adding additional information to the parameter map.

The method may further comprise method step 160, extracting statistical information from the parameter map. As illustrated in FIG. 3, the method step 160 may comprise four substeps. Specifically, a first substep (method step 162) may comprise creating a statistic map 134. Particularly, the statistic map 134, as illustrated in FIG. 2B, may be created, the statistic map 134 containing location correlated values of the statistical information.

The method step 160 may have a second substep (method step 164), comprising storing the statistic map 134. Specifically, the method step 164 may ensure availability of the statistic map 134 after a reset and/or a charging and/or a restart of the autonomous device 110.

Additionally, the method step 160 may have a third substep (method step 166), comprising averaging the information contained in the parameter map. Thereby, for example, indicating a value that may approximate an arithmetic mean of the quantity. Such as, for example an average air temperature within the area of the first room 130 and the second room 132 illustrated in the FIGS. 2A and 2B.

Further, the method step 160 may comprise a fourth substep (method step 168), comprising determining anomalies in parameter values and/or correlating locations. Specifically, the method step 168 may comprise determining locations where the determined parameter outstandingly differs from the average of the determined parameter, such as for example the high particle area 136, the cold spot 138 and the high humidity area 140, illustrated in FIG. 2B.

The method may further have a method step 170, comprising extracting environmental condition information from the statistical information. As illustrated in FIG. 3, the method step 170 may further comprise two substeps. A first substep (method step 172) may comprise creating an environmental map containing location correlated values of the environmental condition information. Further, the method step 170 may comprise a second substep (method step 174), comprising storing the environmental map containing location correlated values of the environmental condition information. Thus, the method step 174 may specifically ensure availability of the environmental condition map after a reset and/or a charging and/or a restart of the autonomous device 110.

The method may further comprise method step 176 generating recommendation information from the environmental condition information. Specifically, recommendation information may be generated from the environmental condition, if the environmental condition information indicates a change of the environmental condition to be desirable. As an example, a danger of mold may be considered to be desirable to reduce, thus, the generated recommendation information may comprise suggestions to modify ventilation habits, such as to reduce the danger of mold.

Further, the method may comprise method step 178 transferring information to an external device 144. Specifically, the method step 178 may comprise transferring information to the external device 144, as illustrated in FIG. 1. As an example, the information may be or may comprise the map 128 and/or the parameter map, the statistical information, such as the statistic map 134, and/or the environmental condition information and/or the recommendation information.

The method may further comprise method step 180 informing a user about the recommendation information by way of a user device. The user device may specifically be a control panel 146, as illustrated in FIG. 1.

The method further may comprise method step 182 adjusting the performance of the autonomous device 110. Specifically, the performing of the task by the autonomous device 110 may be adjusted, such that for example the high particle areas 136 within the statistic map 134 illustrated in FIG. 2B, may be cleaned more frequently than areas with a lower particle quantity.

LIST OF REFERENCE NUMBERS 110 autonomous device
112 spatial sensor
114 further sensor
116 particles
118 doormat
120 front door
122 window
124 task unit
126 electronics unit
128 map
130 first room
132 second room
134 statistic map
136 high particle area
138 cold spot
140 high humidity area
142 interface
144 external device
146 control panel
148 step a): generating location information by using at least one spatial sensor
150 step b): determining at least one further parameter by using at least one further sensor
152 step c): generating a map using the location information
154 step d): connecting the further parameter to the location information and adding the location of the further parameter to the map
156 storing the map and/or the parameter map
158 adding information to the parameter map
160 extracting statistical information from the parameter map
162 creating a statistic map
164 storing the statistic map
166 averaging the information contained in the parameter map
168 determining anomalies in parameter values and/or correlating locations
170 extracting environmental condition information from the statistical information
172 creating an environmental map
174 storing an environmental map 176 generating recommendation information from the environmental condition information
178 transferring information to an external device
180 informing a user about the recommendation information by way of a user device
182 adjusting the performance of the autonomous device

The invention claimed is:

1. An autonomous device configured for performing at least one task selected from a household task, a commercial task and an industrial task, wherein the autonomous device comprises at least one spatial sensor for generating location information and at least one further sensor for determining at least one further parameter, wherein the autonomous device further comprises at least one task unit arranged to perform the household task and/or the commercial task and/or the industrial task, and at least one electronics unit, wherein the electronics unit is configured to generate a map using the location information, wherein the electronics unit further is configured for connecting the at least one further parameter to the location information and adding a location of the at least one further parameter to the map, thereby creating a parameter map containing location-correlated values of the at least one further parameter, wherein the electronics unit is configured to add information to the parameter map, wherein the electronics unit further is configured to extract statistical information from the parameter map, wherein the electronics unit further is configured to store the statistical information in a statistic map and/or to add the statistical information to the parameter map, wherein the electronics unit is configured to adjust performance of the autonomous device using the statistical information, wherein a probability distribution model is used for obtaining the statistical information, and wherein the probability distribution model is selected from the group consisting of: a normal distribution; a Bernoulli distribution; a binominal distribution; a Poisson distribution; a geometrical distribution; and a discrete or continuous uniform distribution.

2. The autonomous device according to claim 1, wherein the electronics unit further is configured for storing the parameter map.

3. The autonomous device according to claim 2, wherein the at least one further parameter is directly or indirectly connected to the household task and/or the commercial task and/or the industrial task.

4. The autonomous device according to claim 3, wherein the autonomous device is an autonomously moving robot selected from the group consisting of a household robot; a commercial robot; and an industrial robot.

5. The autonomous device according to claim 1, wherein the electronics unit is configured to retrieve location related environmental condition information from the statistical information, wherein the electronics unit further is configured to generate recommendation information from the location related environmental condition information.

6. The autonomous device according to claim 5, wherein the autonomous device comprises an interface,
wherein the interface is configured to allow an information transfer to an external device, and
wherein the information is selected from a group consisting of: the map; the parameter map; the statistical information; the environmental condition information; and the recommendation information.

7. The autonomous device according to claim 6, wherein the external device is selected from a group consisting of: a control network configured to fully or partially implement the recommendation information; and a user device configured to fully or partially inform a user about the recommendation information.

8. The autonomous device according to claim 1, wherein the autonomous device is configured for performing outdoor tasks.

9. A method for controlling an autonomous device, wherein the autonomous device is configured for performing at least one task selected from a household task, a commercial task, and an industrial task,
wherein the autonomous device configured for performing at least one task selected from a household task, a commercial task and an industrial task, wherein the autonomous device comprises at least one spatial sensor for generating location information and at least one further sensor for determining at least one further parameter, wherein the autonomous device further comprises at least one task unit arranged to perform the household task and/or the commercial task and/or the industrial task, and at least one electronics unit, wherein the electronics unit is configured to generate a map using the location information, wherein the electronics unit further is configured for connecting the at least one further parameter to the location information and adding a location of the at least one further parameter to the map, thereby creating a parameter map containing location-correlated values of the at least one further parameter, wherein the electronics unit is configured to add information to the parameter map, wherein the electronics unit further is configured to extract statistical information from the parameter map, wherein the electronics unit further is configured to store the statistical information in a statistic map and/or to add the statistical information to the parameter map, wherein the electronics unit is configured to adjust performance of the autonomous device using the statistical information, wherein a probability distribution model is used for obtaining the statistical information, and wherein the probability distribution model is selected from the group consisting of: a normal distribution; a Bernoulli distribution; a binominal distribution; a Poisson distribution; a geometrical distribution; and a discrete or continuous uniform distribution;
wherein the method comprises:
a) generating the location information by using the at least one spatial sensor of the autonomous device;
b) determining the at least one further parameter by using the at least one further sensor of the autonomous device, wherein the method of controlling the autonomous device further comprises configuring the electronics unit of the autonomous device for
c) generating the map using the location information; and
d) connecting the further parameter to the location information and adding the location of the further parameter to the map, thereby creating the parameter map containing the location-correlated values of the at least one further parameter, wherein the method further comprises configuring the electronics unit for adding the information to the parameter map, wherein the method further comprises configuring the electronics unit for extracting the statistical information from the parameter map, and wherein the method further comprises configuring the electronics unit for storing the statistical information in the statistic map and/or adding the statistical information to the parameter map, wherein the method further comprises configuring the electronics unit for adjusting the performance of the autonomous device using the statistical information.

10. The method according to claim 9, further comprising storing the map and/or the parameter map, thereby providing availability of the map and/or the parameter map after a reset and/or a charging and/or a restart of the autonomous device, wherein the method further comprises adding the information to the parameter map.

11. The method according to claim 9, further comprising extracting the statistical information from the parameter map, wherein the method step of extracting the statistical information comprises creating the statistic map containing location correlated values of the statistical information, wherein the method step of extracting the statistical information further comprises storing the statistic map, wherein the method step of extracting the statistical information further comprises averaging the information contained in the parameter map, wherein the method step of extracting the statistical information further comprises determining anomalies in parameter values and/or correlating locations.

12. The method according to claim 11, further comprising extracting environmental condition information from the statistical information, wherein the method step of extracting the environmental condition information comprises creating and/or storing an environmental map containing location correlated values of the environmental condition information.

13. The method according to claim 12, further comprising generating recommendation information from the environmental condition information.

14. The method according to claim 13, further comprising transferring information to an external device, wherein the transferred information is selected from a group consisting of: the map; the parameter map; the statistical information; the environmental condition information; and the recommendation information.

15. The method according to claim 14, further comprising informing a user about the recommendation information by way of a user device.

16. A non-transitory computer readable medium storing computer-executable instructions for performing the method according to claim 10, wherein the computer-executable instructions are executed by a computer or computer network.

* * * * *